Figure 1:
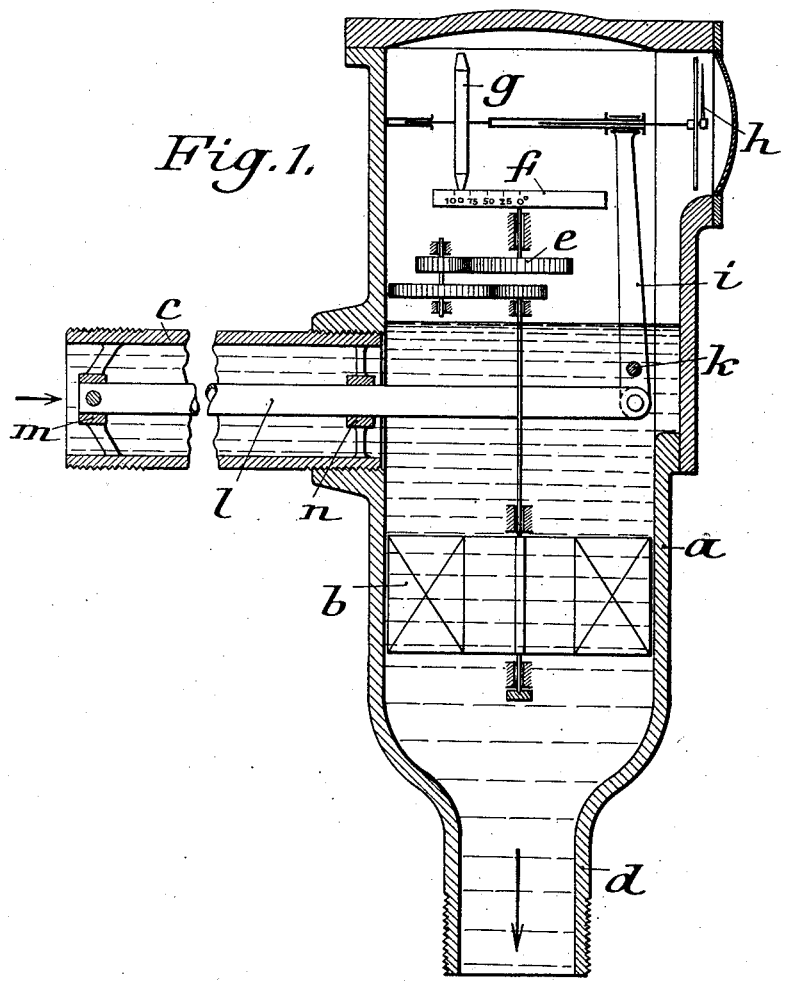

M. HOTTINGER.
CALORIMETER FOR FLOWING LIQUIDS OR GASES.
APPLICATION FILED AUG. 14, 1912.

1,088,280.

Patented Feb. 24, 1914.

2 SHEETS—SHEET 1.

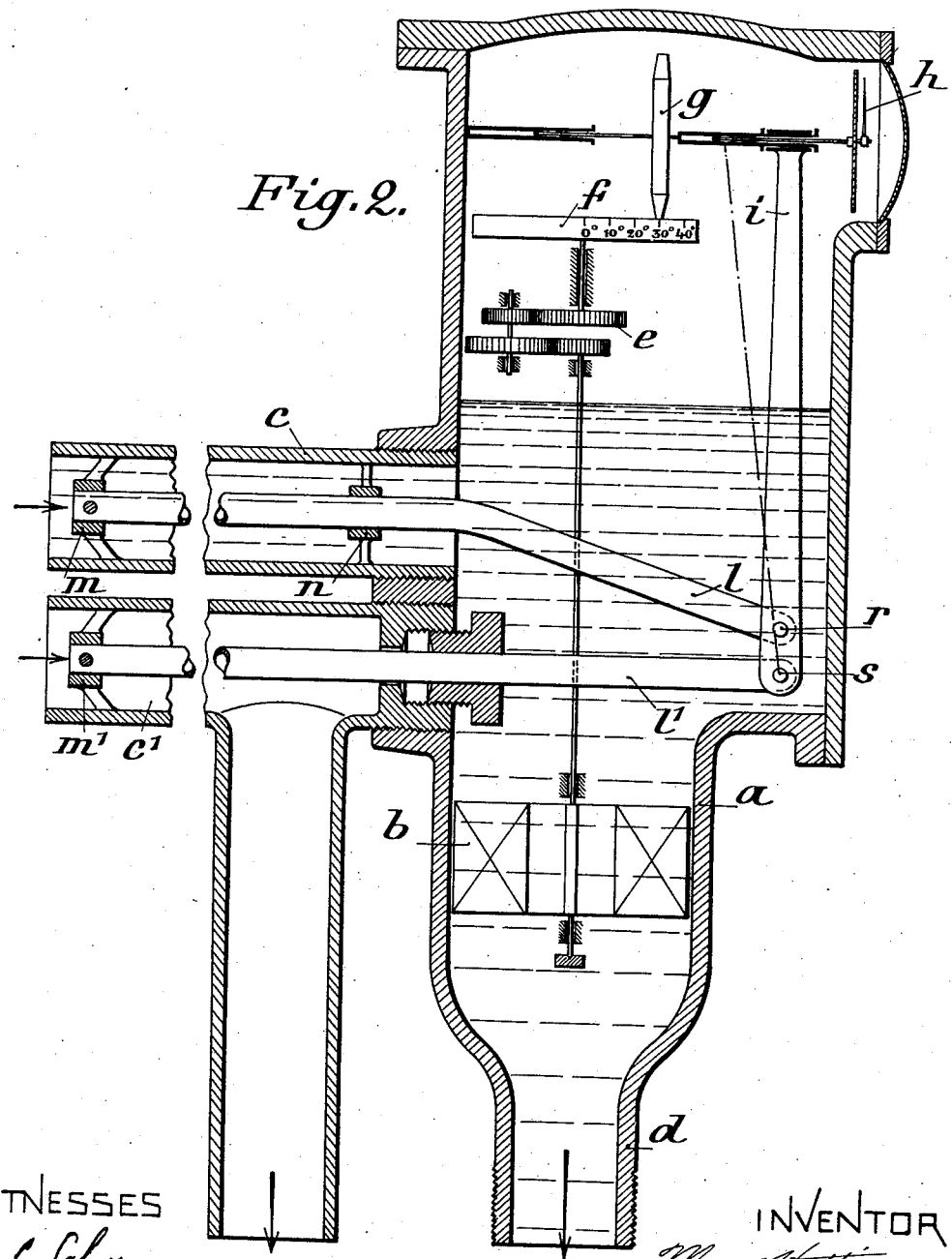

UNITED STATES PATENT OFFICE.

MAX HOTTINGER, OF WINTERTHUR, SWITZERLAND.

CALORIMETER FOR FLOWING LIQUIDS OR GASES.

1,088,280. Specification of Letters Patent. Patented Feb. 24, 1914.

Application filed August 14, 1912. Serial No. 715,008.

*To all whom it may concern:*

Be it known that I, MAX HOTTINGER, engineer, a citizen of the Republic of Switzerland, residing at 21 Tachlisbrumenstrasse, Winterthur, Switzerland, have invented certain new and useful Improvements in Calorimeters for Flowing Liquids or Gases; and I do hereby declare the following to be a full, clear, and exact description of the invention, such as will enable others skilled in the art to which it appertains to make and use the same.

This invention relates to calorimeters for measuring and indicating the quantity of heat of a flowing liquid or gas and capable of being utilized for indicating in hot water heating installations the quantity of heat driven off thereby, or by individual sections thereof.

According to this invention the device which contains an expanding body is so constructed that it gives the product of the quantity of fluid passing through it and of the temperature of the fluid, and thus indicates directly the quantity of heat without necessitating any calculation for the purpose.

Two constructions according to this invention are illustrated by way of example in the accompanying drawing.

Figure 1 is a vertical section through a device which indicates the quantity of heat of a passing liquid, and Fig. 2 is a similar view of a device by means of which it is possible to determine the quantity of heat given off by a particular branch or section of a heating installation.

In the construction shown in Fig. 1, the casing $a$ contains a liquid measuring device $b$ through which flows the medium whose quantity of heat is to be measured on its way from the flow or supply branch $c$ to the return pipe $d$. The rotation of the water measuring wheel is transmitted by means of a toothed wheel or worm gear $e$, which reduces its speed to the disk $f$. This disk in its turn engages a friction wheel $g$, whereby its motion is transmitted to an indicating mechanism $h$ shown by way of example in the drawing in the form of a pointer $h$. The friction wheel $g$ can be shifted on the disk $f$ by means of a lever $i$ pivoted at $k$ to the casing and connected to the lever is a rod $l$ secured at a suitable point, for instance in the branch $c$ at $m$ and passing through a guide $n$.

The rod $l$, which may be hollow or solid, expands with the increase in temperature of the heating medium passing through the device, and contracts when the temperature thereof falls. In that way, when the temperature rises the friction wheel $g$ is shifted by the lever $i$ over the disk $f$ away from the axis of the latter, whereas when there is a decrease in temperature the friction wheel is brought nearer to the axis.

Assuming the number of revolutions of the liquid measuring device to remain constant the friction wheel $g$ and consequently the indicating mechanism $h$ will therefore be driven at a greater speed by the disk $g$ when the temperature increases, than when the temperature sinks. As the speed of the disk $g$ depends on the quantity of water passing through, the pointer $h$ will accordingly indicate directly the quantity of heat corresponding to the product of the quantity of water and the temperature of the water.

If the heat measuring device above described is to be used for ascertaining the quantity of heat consumed in a given section of a hot water heating installation, for instance in a single floor of house, one device of the kind described is inserted into the hot water supply pipe and a second device of the same kind is arranged in the return or discharge pipe of the heating section in question, and the quantity of heat consumed is ascertained by comparing the heat contained in the water supplied, with the heat still remaining in the water discharged. The two devices may in that case be combined in one, controlled partly by the water supplied, and partly by the water discharged and indicating directly the difference in the quantities of heat. A device of the latter kind is illustrated in Fig. 2. The arrangement is on the whole similar to that shown in Fig. 1, only the lever $i$ is controlled by two heat expansion bars $l$, $l'$, one of which $l$ is arranged in the supply pipe $c$ and the other one $l'$ in the return pipe $c'$. The expansion bar $l$ is pivoted to the lever $i$ at $r$, while the bar $l'$ is pivoted to the lever at $s$. If, assuming the same quantity of water is passing through, there is an increase in the temperature difference between the water in the supply pipe $c$ and in the return pipe $c'$, the bar $l$ will expand more than the bar $l'$, or it will contract less than the bar $1'$ or it will expand while the bar $l'$ will contract. In any case the pivot point $r$ will in consequence be shifted to the right relatively to the pivot point $s$ the extent of its movement being proportional to the difference in temperature between the liquids in the pipes $c$ and $c'$. In that way the friction wheel $g$ will be moved away from the axis of the disk $f$ and transmit the motion of the gear $e$ to the indicator $h$ with greater speed than before.

In the case of a decrease in the difference in temperatures between the contents of the pipes $c$ and $c'$ the reverse will take place. The indicating mechanism will therefore show not only the quantity of water passing through, but also the quantity of heat—(corresponding to the product of the said quantity of water and of the difference in the temperatures of $c$ and $c'$)—consumed in the particular section of the heating installation. Should the temperature in $c$ and $c'$ increase and decrease to the same extent, and in that way the difference in temperatures remains the same, the bars $l$ and $l'$ will expand or contract uniformly and in the same direction, so that the pivot points $r$ and $s$ will be jointly shifted to the right or to the left. There will then take place a parallel shifting of the lever $i$, which however will be so slight owing to the small difference in length of the heat expansion bars, that the shifting of the friction wheel $g$ produced thereby, will be of no practical importance. When however the pivot points $r$ and $s$ are shifted unequally the friction wheel $g$ will be appreciably moved owing to the magnifying effect of the lever $i$.

Claims.

1. A calorimeter for fluids comprising a motor adapted to be actuated by the fluid passing through the calorimeter, an indicating device, gearing disposed between said motor and indicating device and comprising a shiftable element, a longitudinally expansible member in direct contact with the fluid passing through the calorimeter, and connections between said member and said shiftable element of the gearing whereby the longitudinal movement of said expansible member changes the ratio of the gearing by shifting said element.

2. A calorimeter for fluids comprising a motor adapted to be actuated by the fluid passing through the calorimeter, an indicating device, gearing disposed between said motor and indicating device and comprising a shiftable element, a longitudinally expansible member in direct contact with the fluid passing through the calorimeter, and a pivoted lever connected at one end to said expansible member and at the other end to said shiftable element of the gearing whereby the longitudinal movement of the expansible member changes the ratio of the gearing by shifting said element.

3. A calorimeter for fluids comprising a motor adapted to be actuated by the fluid passing through the calorimeter, an indicating device, gearing disposed between said motor and indicating device and comprising a shiftable element, a longitudinally expansible member in direct contact with the fluid passing through the calorimeter, a lever pivoted near one end and connected at the extremity of its long arm to said shiftable element of the gearing and at the extremity of its short arm to said expansible member whereby slight longitudinal movements of the expansible member produce immediate shifting of said element of the gearing to thereby change the ratio of the gearing.

4. A calorimeter for fluids comprising a motor adapted to be actuated by the fluid passing through the calorimeter, an indicating device, gearing disposed between said motor and indicating device and comprising friction disks, the peripheral edge of the driven disk being in contact with the face of the driving disk, a longitudinally expansible member in direct contact with the fluid passing through the calorimeter, and a direct mechanical connection between said expansible member and said driven disk whereby longitudinal movements of said expansible member produce a shifting movement of the driven disk over the face of the driving disk.

5. A calorimeter for fluids comprising a motor adapted to be actuated by the fluid passing through the calorimeter, an indicating device, gearing disposed between said motor and indicating device and comprising a shiftable element, a longitudinally expansible member in direct contact with a portion of the fluid passing through the calorimeter, a direct mechanical connection between said member and said shiftable element of the gearing, a second longitudinally expansible member subjected to a second and separate portion of the fluid passing through the calorimeter and also connected to said direct mechanical connection between the first expansible member and the shiftable element of the gearing whereby the differential expansion of said members produces a shifting of said element of the gearing.

In testimony whereof I have affixed my signature, in presence of two witnesses.

M. HOTTINGER.

Witnesses:
HARRY A. MCBRIDE,
AUGUST RÜEGG.